(12) United States Patent
Panis et al.

(10) Patent No.: US 10,386,268 B2
(45) Date of Patent: Aug. 20, 2019

(54) METHOD FOR PROCESSING A VOLTAGE SIGNAL RELATING TO THE PRESSURE PREVAILING IN A COMBUSTION CHAMBER OF A CYLINDER OF AN INTERNAL COMBUSTION ENGINE

(71) Applicants: CONTINENTAL AUTOMOTIVE FRANCE, Toulouse (FR);
CONTINENTAL AUTOMOTIVE GmbH, Hannover (DE)

(72) Inventors: Guerric Panis, Durenque (FR);
Christophe Duchemin, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 514 days.

(21) Appl. No.: 14/930,173

(22) Filed: Nov. 2, 2015

(65) Prior Publication Data

US 2016/0123841 A1    May 5, 2016

(30) Foreign Application Priority Data

Nov. 3, 2014 (FR) .................................... 14 60582

(51) Int. Cl.
*G01M 15/08* (2006.01)
*F02D 35/02* (2006.01)
(Continued)

(52) U.S. Cl.
CPC .......... *G01M 15/08* (2013.01); *F02D 35/023* (2013.01); *G01L 23/08* (2013.01); *G01L 23/226* (2013.01); *Y02T 10/40* (2013.01)

(58) Field of Classification Search
CPC ....... Y02T 10/46; Y02T 10/40; F02D 35/023; F02D 2041/286; G01M 15/08; G01M 15/09; F02P 17/12
See application file for complete search history.

(56) References Cited

U.S. PATENT DOCUMENTS

| | | | |
|---|---|---|---|
| 4,163,385 A * | 8/1979 | Kato | G01M 15/08 73/35.03 |
| 4,596,043 A * | 6/1986 | Leitch | H03F 1/0266 332/159 |

(Continued)

FOREIGN PATENT DOCUMENTS

| | | |
|---|---|---|
| CN | 1667256 A | 9/2005 |
| CN | 102797574 A | 11/2012 |

(Continued)

OTHER PUBLICATIONS

French Search Report, dated Jun. 30, 2015, from corresponding French Application.

*Primary Examiner* — Mischita L Henson
*Assistant Examiner* — Christine Y Liao
(74) *Attorney, Agent, or Firm* — Young & Thompson

(57) ABSTRACT

A method for processing a voltage signal relating to the pressure prevailing in a combustion chamber of a cylinder of an internal combustion engine, the signal, referred to as an "input signal", having, in alternation, "plateau" phases and main peak phases. The method includes a step (E1) of rectification of the input signal such that the gradient of the base signal is zero, a step (E2) in which the peaks of the rectified signal of which the amplitude is greater than a predetermined voltage value are clipped so as to obtain an at least partially clipped signal referred to as a "clipped signal", a step (E3) of detection of a main peak when the amplitude of the input signal is greater than the amplitude of the (Continued)

clipped signal, and a step (E4_1, E4_2) of compensation of the input signal in the absence of such a detection.

10 Claims, 5 Drawing Sheets

(51) Int. Cl.
  *G01L 23/08* (2006.01)
  *G01L 23/22* (2006.01)

(56) References Cited

U.S. PATENT DOCUMENTS

| | | |
|---|---|---|
| 2005/0199049 A1 | 9/2005 | Okubo et al. |
| 2011/0264392 A1 | 10/2011 | Ramond et al. |
| 2012/0303238 A1 | 11/2012 | Verner et al. |
| 2012/0304962 A1* | 12/2012 | Tumelaire ........... F02D 41/1497 123/349 |
| 2014/0067233 A1 | 3/2014 | Nishida et al. |
| 2015/0226626 A1 | 8/2015 | Landrevie et al. |

FOREIGN PATENT DOCUMENTS

| | | |
|---|---|---|
| CN | 103066827 A | 4/2013 |
| CN | 103670746 A | 3/2014 |
| FR | 2 938 645 A1 | 5/2010 |
| FR | 2 995 681 A1 | 3/2014 |
| GB | 1188337 | 4/1970 |
| GB | 1298615 | 12/1972 |
| JP | 09028080 A | 1/1997 |

* cited by examiner

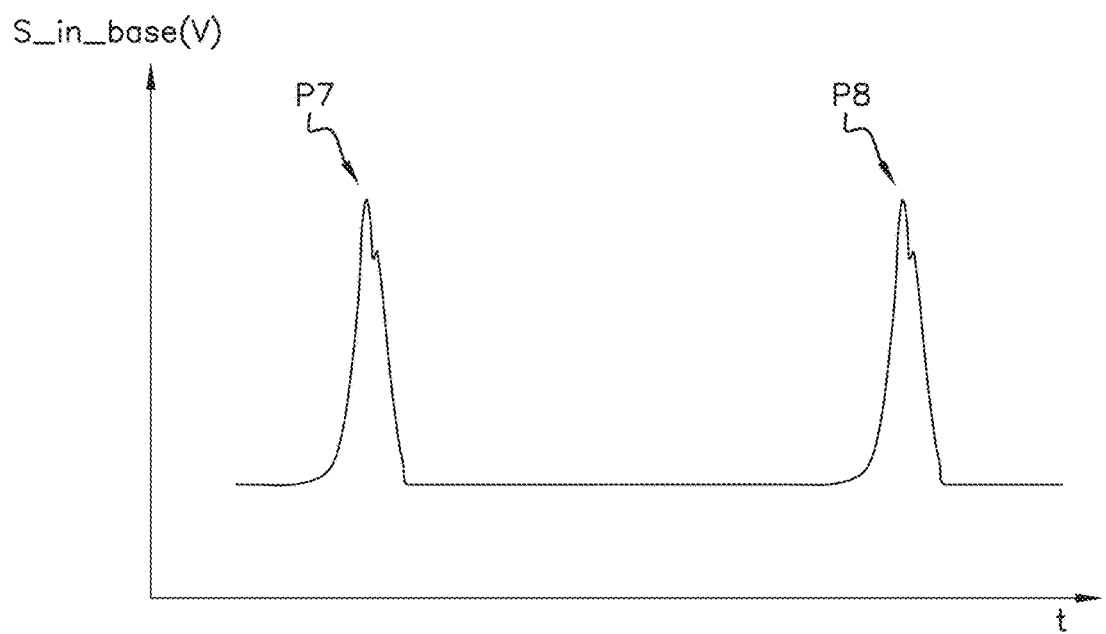
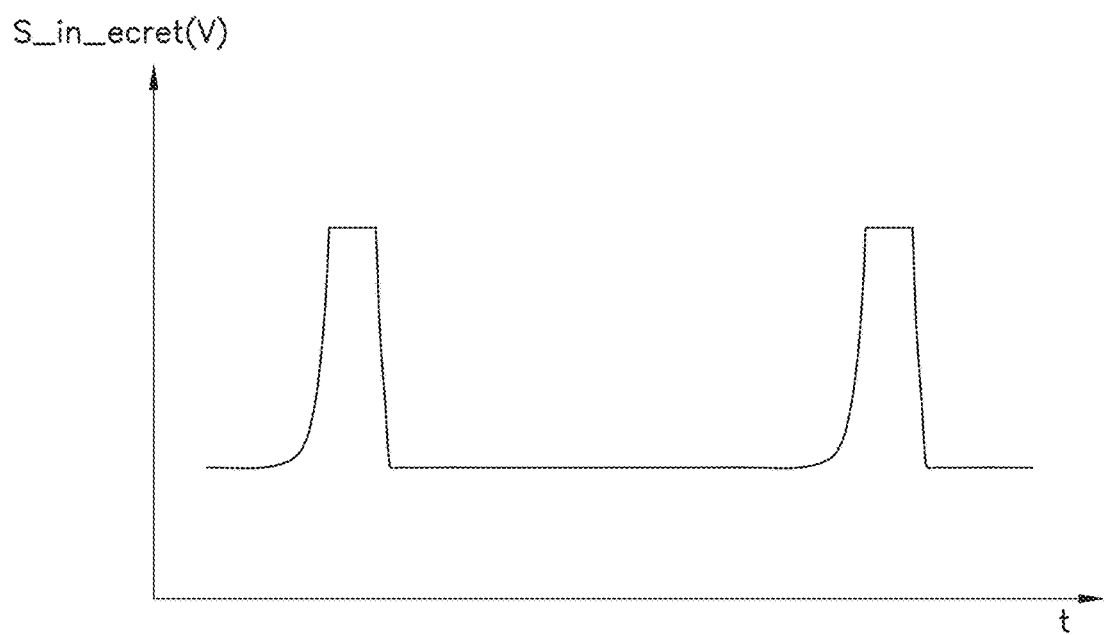

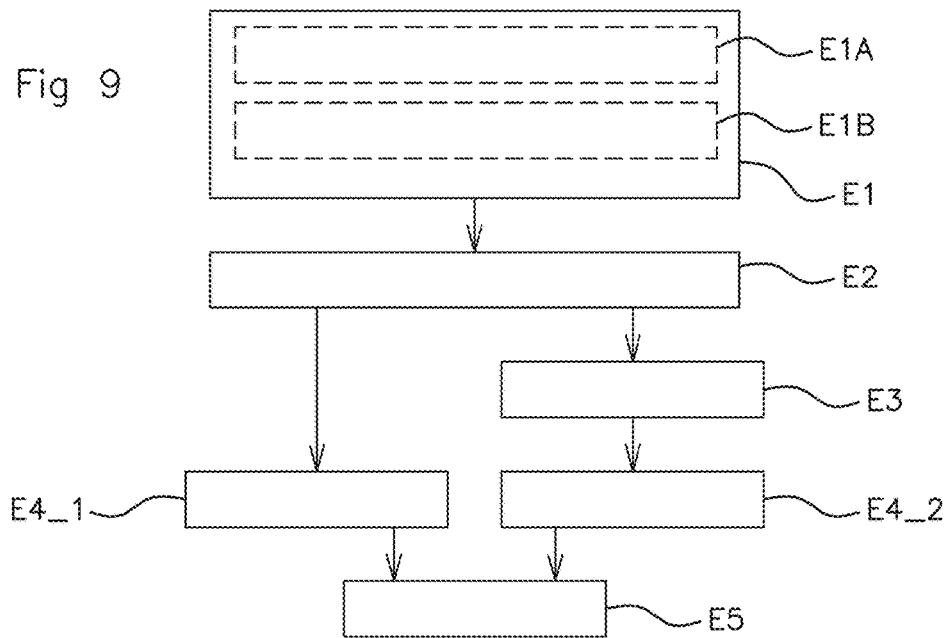
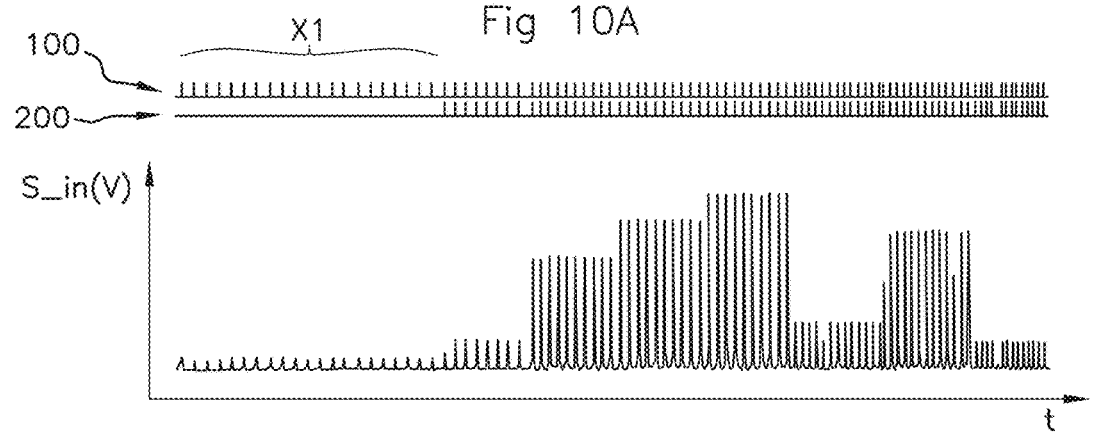
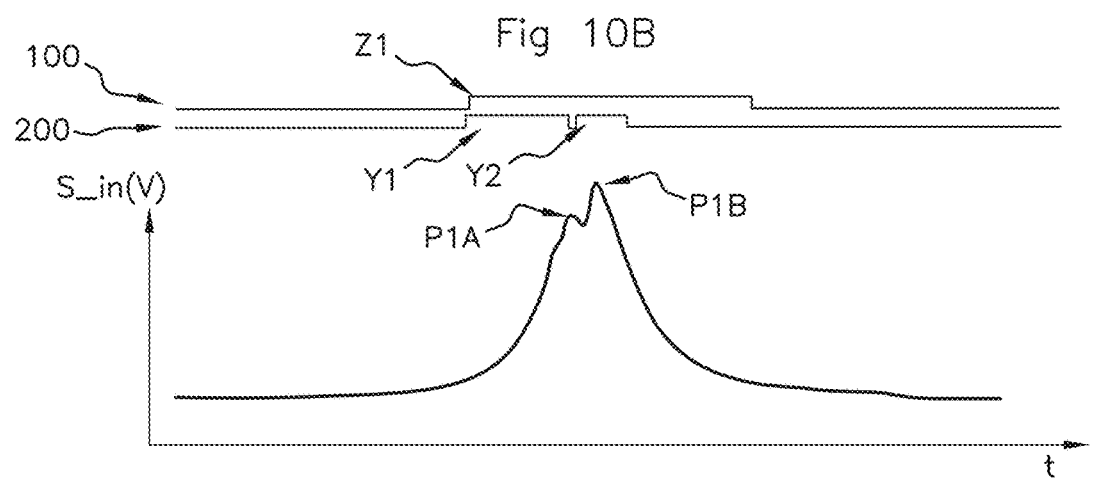

METHOD FOR PROCESSING A VOLTAGE SIGNAL RELATING TO THE PRESSURE PREVAILING IN A COMBUSTION CHAMBER OF A CYLINDER OF AN INTERNAL COMBUSTION ENGINE

FIELD OF THE INVENTION

The present invention relates to the field of measurement of pressure prevailing in a cylinder of an internal combustion engine and more particularly relates to a method for processing a voltage signal relating to the pressure prevailing in a combustion chamber of a cylinder of an internal combustion engine, and to an associated device.

BACKGROUND OF THE INVENTION

An internal combustion engine usually has cylinders each defining a combustion chamber, in which fuel and a combustion agent are introduced for the combustion of the mixture. The engine allows the energy released by this combustion to be transformed into mechanical energy.

In such an engine it is known to provide each cylinder with a sensor for measuring the pressure prevailing in the combustion chamber of said cylinder, the set of sensors being connected to a processing unit. This processing unit is generally provided, as is known, in the form of a computer referred to as an electronic control unit (engine control unit or ECU), which makes it possible to adjust the control parameters of the engine of the vehicle, such as the injection of fuel into the cylinder or the post-treatment of polluting emissions.

A pressure measurement sensor, as is known, uses the variations of electrical charge of a sensitive piezoelectric element to provide, in a relative manner, an indication of the pressure prevailing in the cylinder. Such a sensor, at the output, provides a voltage signal representative of these pressure variations. An example of a signal provided by a pressure measurement sensor in a cylinder is illustrated in FIG. 1. This voltage signal S_in varies in terms of frequency and amplitude and alternates between substantially linear phases and voltage peaks, referred to as "main peaks", representing the peaks of the pressure prevailing inside the combustion chamber of the cylinder during phases of compression and combustion of the gases.

The linear phases progress substantially in accordance with a straight line of zero, positive, or negative gradient. The non-zero values of this gradient result from noises and offsets, caused in particular by phenomena of pyroelectricity and/or vibrations experienced by the sensor. In particular the heating of the ceramic by the heat released by the combustion of the gases in the cylinder may create a current generating an additional electrical charge in the sensor, referred to as "pyroelectricity".

More precisely, FIG. 2 shows a detailed example of a noised voltage signal S_in of a pressure measurement sensor, said signal progressing over time t in accordance with a straight line of positive gradient A. As explained above, the signal S_in may be assimilated to an alternation between "plateau" phases SP1, SP2, SP3, during which the voltage differs from a reference value VREF and progresses over time on average in accordance with a straight line, in this example with a positive gradient, and voltage peaks P1, P2, P3, which are representative of combustion pressure peaks.

The signal S_in generally has weak variations VAR representative of noise. In addition, as illustrated in FIG. 10B, a main peak may have variations at the apex thereof taking the form of a double-peak P1A, P1B. This double-peak P1A, P1B is representative of the combustion noises of the gases in the cylinder when the pressure reaches maximum values in the combustion chamber. In addition, pressure peaks of low amplitude, referred to as "secondary peaks" PS (with reference to FIG. 8), may be generated by valve noises and may reach amplitudes close to main peaks of low amplitude (i.e. at low speed of the engine of the vehicle).

The processing unit processes the voltage signal S_in at the output of each sensor so as to make it usable by the electronic control unit ECU. This processing includes a rectification of the signal so as to compensate for the offset thereof. With this objective it is necessary to detect the pressure peaks in order to compensate the signal solely during the plateau phases and so as to thus obtain a signal having, in alternation, original main peaks and plateaus of zero gradient. For this purpose the processing unit, as is known, comprises a peak detection sub-unit and a compensation sub-unit aiming to compensate for the gradient of the signal. The processing unit is generally provided in the form of a dedicated integrated circuit of the "ASIC" type (application specific integrated circuit), connected to the pressure measurement sensor.

A method known from the prior art, based on "Kalman" filters, is based on a method for the recursive correction of an error between the output signal and the prediction thereof attenuated by a gain. The prediction of the signal is then calculated on the basis of the filtered and corrected signal at the moment of prior acquisition. More particularly and in accordance with document FR 2 938 645 A1, it is known to use two Kalman filters: a "fast" Kalman filter, i.e. having gradient and constant gains with high values for the points belonging to the pressure peaks, and a "slow" Kalman filter, i.e. having gradient and constant gains with low values for determining the offset of the signal, i.e. the offset during the plateau phases. This method makes it possible to correct the signal point by point on the basis of whether or not said point belongs to the plateaus.

Such a method, however, has a number of disadvantages. Firstly, each point of the signal is processed by a complex calculation using a Kalman filter, which is time-consuming and uses a significant amount of the memory of the ASIC circuit. Then, the method is difficult to calibrate since it has four variables to be parameterized: a pair comprising a gradient gain and a constant gain for the fast Kalman filter and another pair comprising a gradient gain and a constant gain for the slow Kalman filter. In addition, as illustrated in FIG. 10B, the oscillations of the signal at the apex of the main peaks at the start of combustion lead the Kalman filter to detect a number of peaks P1A, P1B and to improperly compensate for the signal therebetween. Still with reference to FIG. 10B, the peak detection signal 200 then performs an erroneous double detection Y1, Y2, making the compensated signal inaccurate, which is detrimental to the adjustment of the operating parameters of the engine. Likewise, the peaks representing valve noises, or what are known as secondary peaks PS (with reference to FIG. 8), may be confused by the Kalman filter with low-value main pressure peaks (for example the peak P6 in FIG. 8), which leads the Kalman filter to improperly compensate for the signal therebetween, thus rendering the compensated signal inaccurate, which is also detrimental to the adjustment of the operating parameters of the engine.

The object of the present invention is to overcome these disadvantages by proposing a simple and reliable solution for detecting, with accuracy, the main pressure peaks of the gases in a cylinder of an internal combustion engine of a vehicle so as to provide a compensated signal that can be used effectively in order to manage the parameters of the engine.

SUMMARY OF THE INVENTION

For this purpose the invention firstly relates to a method for processing a voltage signal relating to the pressure prevailing in a combustion chamber of a cylinder of an internal combustion engine, said signal, referred to as an "input signal", having, in alternation, "plateau" phases, during which the "base" signal progresses on average in accordance with a linear function over time, and phases of main peaks, during which the signal is representative of the pressure peaks prevailing in the combustion chamber, said method comprising:
 a step of rectification of the input signal such that the gradient of the base signal is zero,
 a step in which the peaks of the rectified signal of which the amplitude is greater than a predetermined voltage value are clipped so as to obtain an at least partially clipped signal referred to as a "clipped signal",
 a step of detection of a main peak when the amplitude of the input signal is greater than the amplitude of the clipped signal,
 a step of compensation of the input signal in the absence of such a detection.

The input signal further comprising secondary noise peaks, the predetermined clipping value is preferably selected so as to allow the clipping of the main peaks whilst avoiding the clipping of the secondary noise peaks, for example a predetermined clipping value corresponding to a pressure between 25 and 30 bar in the combustion chamber of the cylinder.

Alternatively, in particular when certain peaks of low amplitude corresponding to low-speed operation of the engine have not been clipped, the method comprises, between the step of clipping and the step of detection, a step of generation of a peak signal, said peak signal being weighted with a gain coefficient with a first value lower than or equal to 1 when it is greater than the value of the clipped signal and being equal to the clipped signal in the other cases, the detection of a main peak being performed when the amplitude of the input signal is greater than the amplitude of the peak signal. This weighting is applied at a moment t to the value of the peak signal at the previous moment t−1, such that the gradient of the peak signal decreases between two peaks when the first gain value is less than 1 and is constant when the first gain value is equal to 1.

In this case the predetermined clipping value is preferably selected so as to clip the main peaks of high amplitude whilst avoiding the clipping of secondary noise peaks, which may be of an amplitude indicative of high-speed operation of the engine. The peak signal then connects the clipped main peaks and the non-clipped main peaks of the clipped signal by decreasing therebetween so as to allow the detection of the main peaks of low amplitude. Such a detection then defines, for each main peak, a window during which the rectified signal corresponds to a main peak and does not require compensation. The use of a peak signal of negative gradient between two peaks makes it possible to detect a sudden change in amplitude of the main pressure peaks, in particular from a main peak of high amplitude (high engine speed) to a main peak of low amplitude (low engine speed).

The value of this negative gradient may be adapted on the basis of the frequency and amplitude of the signal.

Thus, when the peak signal reaches a predetermined level close to the noise level of the secondary peaks, the value of the gain coefficient may be fixed at a second value greater than the first value, such that the peak signal decreases more slowly. In the absence of a peak during a predetermined period or when the peak signal reaches the predetermined noise level, it is possible advantageously to fix the value of the gain to 1 such that the peak signal does not decrease further until the noise level between two peaks in order to adjust the variable of the predetermined noise level in real time.

Again preferably, the rectification comprises the sub-steps of estimation of the base signal and subtraction of the estimated base signal from the input signal.

The invention also relates to a device for processing a signal, comprising:
 a pressure measurement sensor able to generate a voltage signal relating to the pressure prevailing in a combustion chamber of a cylinder of an internal combustion engine, said signal, referred to as an "input signal", having, in alternation, "plateau" phases, during which the "base" signal progresses on average in accordance with a linear function over time, and main peak phases, during which the signal is representative of the pressure peaks prevailing in the combustion chamber,
 a processing unit, comprising:
  a peak detection sub-unit comprising means for rectification of the input signal such that the gradient of the base signal is zero, means for clipping peaks of the rectified signal of which the amplitude is greater than a predetermined voltage value so as to obtain an at least partially clipped signal, referred to as a "clipped signal", and means for detecting a main peak when the amplitude of the input signal is greater than the amplitude of the clipped signal, and
  a sub-unit for compensation of the input signal in the absence of a detection by the detection sub-unit.

In a first embodiment of the device according to the invention the input signal also comprising secondary noise peaks, the clipping means are configured to clip the main peaks whilst avoiding the clipping of secondary noise peaks. In other words, the predetermined clipping value is selected so as to clip the main peaks whilst avoiding the clipping of secondary noise peaks.

In a second embodiment of the device according to the invention, in particular when certain peaks of low amplitude corresponding to low-speed operation of the engine have not been clipped, the detection sub-unit comprises means for generating a peak signal, said peak signal being weighted by a gain coefficient with a first value lower than or equal to 1 when greater than the clipped signal and being equal to the clipped signal in the other cases, the detection of a main peak being performed when the amplitude of the input signal is greater than the amplitude of the peak signal.

When the peak signal reaches a predetermined level, the generation means are advantageously configured to fix the value of the gain coefficient at a second value greater than the first value, such that the peak signal decreases more slowly. In the absence of a peak during a predetermined period or when the peak signal reaches the predetermined noise level, it is then possible to fix the value of the gain at 1. In addition, it may be envisaged to measure the noise level between two peaks in order to adjust the variable of the predetermined noise level in real time.

The invention lastly relates to a vehicle, in particular a motor vehicle, comprising such a device.

BRIEF DESCRIPTION OF THE DRAWINGS

Further features and advantages of the invention will become clear from the description provided hereinafter with reference to the accompanying figures, which are given by way of non-limiting examples and in which identical references designate similar elements.

FIG. 5 illustrates an output signal of a pressure measurement sensor, rectified on the basis of the estimation of FIG. 4, FIG. 6 illustrates the clipping of the rectified signal of FIG. 5, FIG. 10A is a comparative example of simulation of a device of the prior art based on a Kalman filter and of the device according to the invention, in particular with peaks of low amplitude, FIG. 10B is a comparative example of simulation of a device of the prior art based on a Kalman filter and of the device according to the invention, in particular with peak of high amplitude.

DETAILED DESCRIPTION OF THE INVENTION

The device 1 for processing a signal according to the invention is intended to be installed in a vehicle comprising an internal combustion engine having one or more cylinders, each cylinder defining a combustion chamber in which fuel may be injected and burned.

Figure 3:
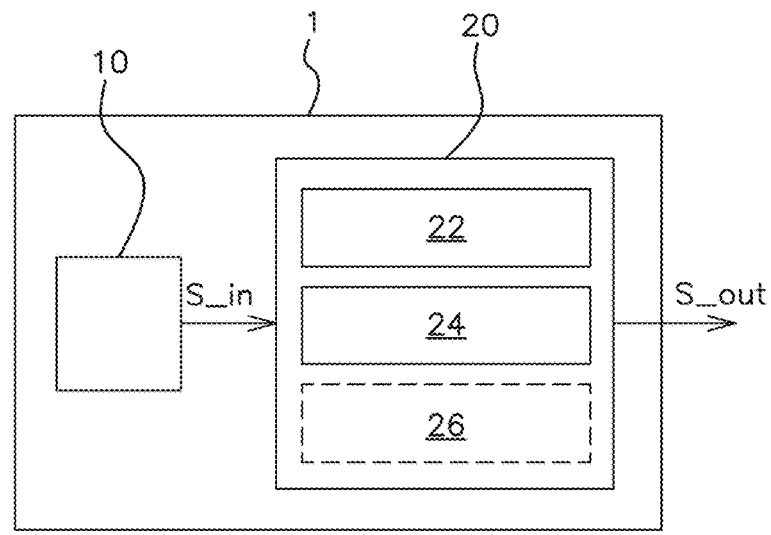
FIG. 3 is a schematic view of a pressure measurement device according to the invention.

FIG. 3 illustrates an embodiment of the device 1 for processing a signal according to the invention. Such a device 1 comprises a pressure measurement sensor 10 connected to a processing unit 20.

The pressure measurement sensor 10, known to the person skilled in the art, delivers a voltage signal relating to the pressure prevailing in the combustion chamber of a cylinder of the motor vehicle.

With reference to FIGS. 3 to 8, this signal is referred to as the "input signal" S_in because it is provided at the input of the processing unit 20. The input signal S_in has, in alternation, "plateau" phases, during which the signal, referred to as the "base" signal, progresses over time on average in accordance with a straight line, and peak phases, referred to as "main peaks", during which the signal is representative of the pressure peaks in the combustion chamber.

Figure 1:
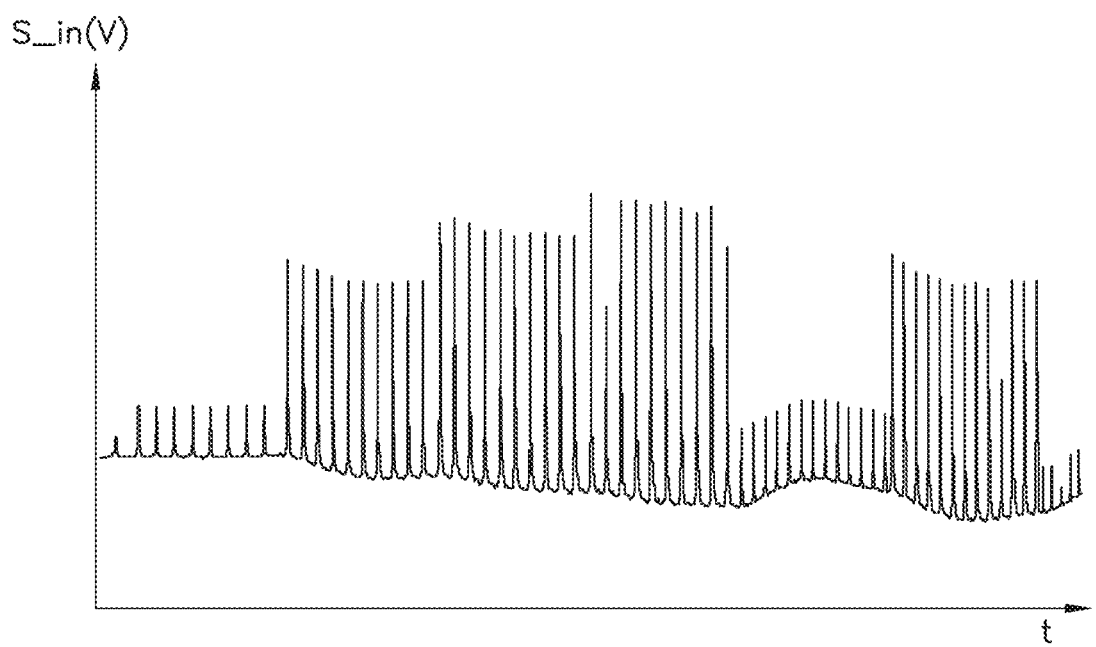
FIG. 1, which has already been discussed, is an example of an output signal of a pressure measurement sensor, FIG. 2, which has already been discussed, is an example of an output signal of a pressure measurement sensor.
Figure 2:
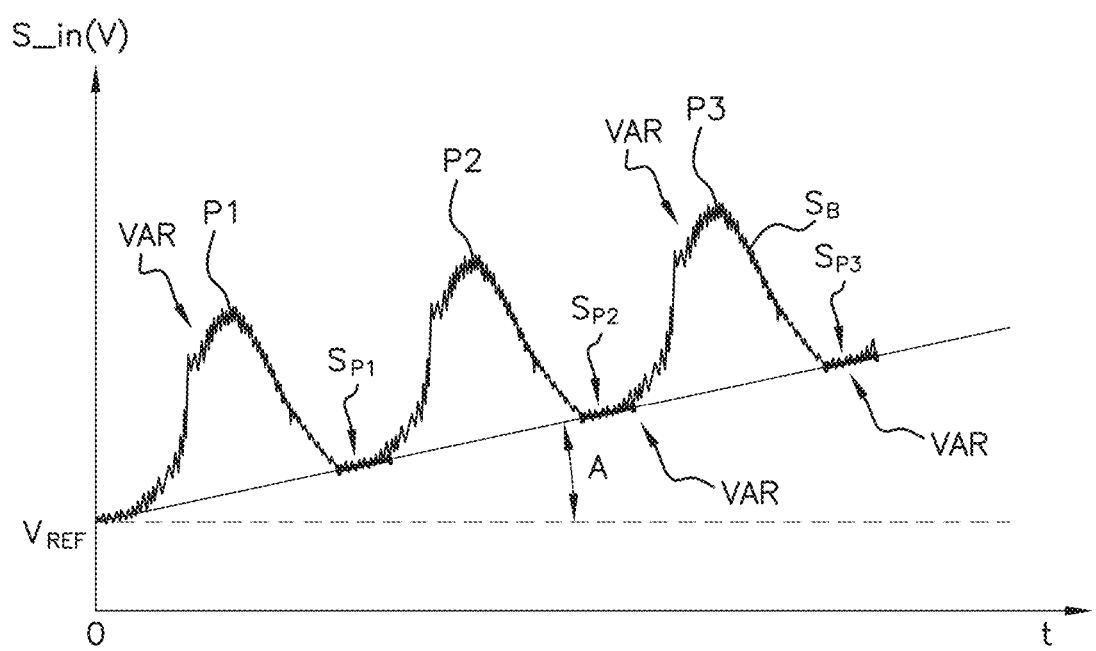

By way of example and as already discussed, FIG. 2 illustrates a detailed example of the noised voltage signal S_in of a pressure measurement sensor, said signal progressing over time t in accordance with a straight line of positive gradient A. The signal S_in may be assimilated to an alternation of "plateau" phases SP1, SP2, SP3, during which the voltage is different from a reference value VREF and progresses over time on average in accordance with a straight line, in this example of positive gradient, and voltage peaks P1, P2, P3 representative of combustion pressure peaks.

The signal S_in has weak variations VAR representative of the noise. In addition, as illustrated in FIG. 10B, a main peak may have variations at the apex thereof taking the form of a double-peak P1A, P1B. This double-peak PIA, P1B is representative of the combustion noises of the gases in the cylinder when the pressure reaches maximum values in the combustion chamber. In addition, pressure peaks of low amplitude, referred to as "secondary peaks" (of which an example PS is illustrated between the pressure peaks P4 and P5 in FIG. 8), may be generated by valve noises and may reach amplitudes close to main peaks of low amplitude (i.e. at low speed of the engine of the vehicle), such as the peak P6 in FIG. 8.

With reference to FIG. 3, the input signal S_in is acquired and processed by the processing unit 20, which at the output delivers a processed signal S_out. This signal S_out is sent to a control unit of the vehicle (not shown), for example of the ECU type (electronic control unit) in order to manage, in particular, the operating parameters of the engine, such as the moment and duration of injection of fuel into the cylinders. Because this vehicle control unit is known to a person skilled in the art, it will not be discussed in greater detail.

The processing unit 20 comprises a peak detection sub-unit 22 and a signal compensation sub-unit 24.

The signal compensation sub-unit 24 makes it possible to compensate for the offsets of the signal by adding or removing a voltage value to/from the input signal S_in, referred to as an offset value by the person skilled in the art, so that the plateau phases have a zero gradient and the output signal can then be used for the control unit of the vehicle.

The detection sub-unit 22 makes it possible to detect the main voltage peaks P4, P5, P6 (see FIG. 8) of the input signal S_in such that the signal is compensated for by the signal compensation sub-unit 24 solely during the plateau phases.

In accordance with the invention, with reference to FIGS. 3 to 8, the detection sub-unit 22 comprises:
  means for rectifying the input signal S_in such that the gradient of the base signal is zero,
  means for clipping peaks of the rectified signal S_in_base of which the amplitude is greater than a predetermined voltage value so as to obtain an at least partially clipped signal referred to as a "clipped signal" S_in_ecret,
  means for detecting a main peak when the amplitude of the input signal S_in is greater than the amplitude of the clipped signal S_in_ecret.

Figure 8:
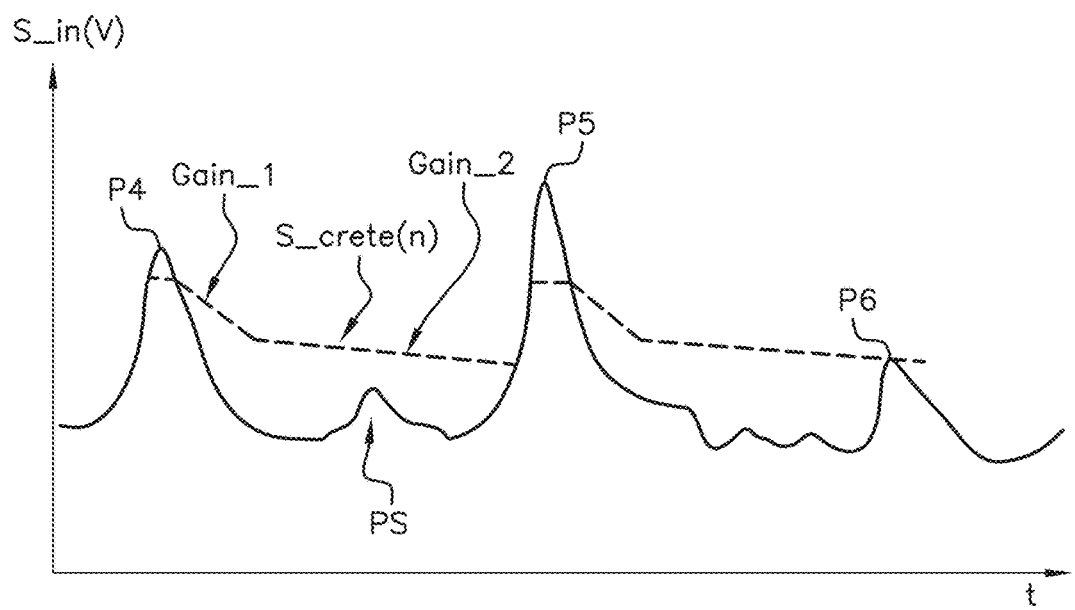
FIG. 8 illustrates an example of a peak signal, FIG. 9 schematically illustrates the method according to the invention.

In a first embodiment of the device according to the invention, with reference to FIGS. 5 and 8, the clipping means are configured to clip the main peaks P7, P8 whilst avoiding the clipping of secondary noise peaks PS. In other words, the predetermined clipping value is selected so as to clip the main peaks P7, P8 whilst avoiding the clipping of secondary noise peaks PS.

In a second embodiment of the device according to the invention, in particular when some peaks of low amplitude corresponding to a low-speed operation of the engine have not been clipped, the detection sub-unit 22 comprises means for generating a peak signal S_crete (with reference to FIG. 7), said peak signal S_crete being weighted by a gain coefficient with a first value less than or equal to 1 when greater than the clipped signal and being equal to the clipped signal in the other cases, the detection of a main peak being performed when the amplitude of the rectified signal is greater than the amplitude of the peak signal. This makes it possible advantageously to avoid analyzing the gradient of the input signal, which could be confused with the ascent of a peak when this gradient is steep.

The rectification means may be configured in order to estimate the base signal and to subtract this estimated base signal from the input signal.

In this example the processing unit 20 also comprises a filtration sub-unit 26 making it possible to filter the noises present over the output signal S_in of the sensor 10.

The detection sub-unit 22, the signal compensation sub-unit 24, and the filtration sub-unit 26 may be provided on the basis of analog/digital converters, charge amplifiers, etc., as is known by the person skilled in the art. Lastly, the processing unit 20 may be provided for example in the form of an integrated circuit of the ASIC type.

The invention will now be described in terms of its implementation.

The implementation is described with reference to FIGS. 3 to 9.

The sensor 10 firstly measures the pressure prevailing in the combustion chamber of the cylinder in order to generate a voltage signal referred to as an input signal S_in. As described before, the input signal S_in has, in alternation, "plateau" phases, during which the signal is referred to as a "base" signal and progresses on average in accordance with a straight line, and main peak phases, during which the signal is representative of the pressure peaks in the combustion chamber.

Figure 4:
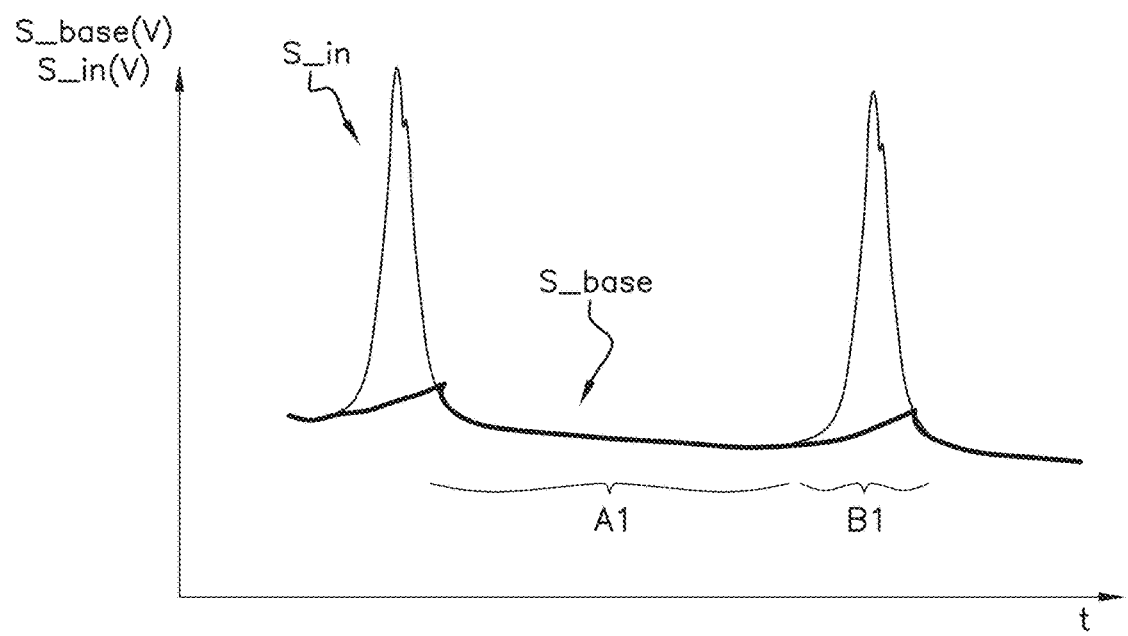
FIG. 4 illustrates a curve of estimation of a base signal of the output signal of a pressure measurement sensor.

When received at the input of the processing unit 20, the input signal S_in is rectified by the rectification means of the detection sub-unit 22 in a step E1 (see FIG. 4).

For this purpose the base signal S_base is firstly estimated in a step E1A. With reference to FIG. 4, the estimated base signal S_base comprises portions A1 corresponding to the plateaus of the input signal S_in, these portions being connected to one another by straight line portions B1 of positive gradient. Each point of a straight-line portion is generated using a gain factor K such that the base signal S_in drops away from the input signal S_in when the latter rises significantly (i.e. during a peak). This gain factor K can be parameterized and must be sufficiently large so as not to drop away over an offset variation at 0.1 Hz. The gain factor K may also be a variable calculated on the basis of the gradient of the offset measured prior to the dropaway. It is also possible to use a sum: S_base=S_base+C, in which C is a constant.

The estimation of the base signal S_base thus obtained is then subtracted from the input signal S_in in a step E1B so as to obtain a rectified signal S_in_base, i.e. of which the average gradient of the plateaus is zero, as illustrated in FIG. 5.

As illustrated in FIG. 6, the main peaks of the rectified signal S_in_base are then clipped in a step E2 at a predetermined voltage value so as to obtain an at least partially clipped signal referred to as a "clipped signal" S_in_ecret.

In a first embodiment this predetermined voltage value is selected such that all of the main peaks are clipped. Thus, for example, the value of the maximum amplitude of the noise peaks can be measured and the predetermined voltage value can be selected so as to always be greater than this value of maximum amplitude.

A typical maximum amplitude value of thermal or vibratory noise, i.e. the value of the pressure of a secondary noise peak PS, is approximately 5 bar. By contrast, a typical maximum amplitude value of valve noise is approximately 25 bar. A typical minimum amplitude value of the main peaks is approximately 30 bar. The predetermined clipping voltage value may then be fixed for example at 90% of the typical minimum amplitude value of the main peaks, for example the voltage of the signal equivalent to 27 bar. The detection of a main peak is then performed in a step E4_1 when the amplitude of the input signal S_in is greater than the amplitude of the clipped signal S_in_ecret.

In a second embodiment the predetermined voltage value is selected such that only the main peaks of high amplitude are clipped, so as to limit or eliminate the risks of clipping and therefore of detection of a secondary valve noise peak PS, of which the amplitude could accidentally be greater than the minimum amplitude of the main peaks. The main peaks of which the amplitude is lower than the predetermined voltage value then are not clipped.

Figure 7:
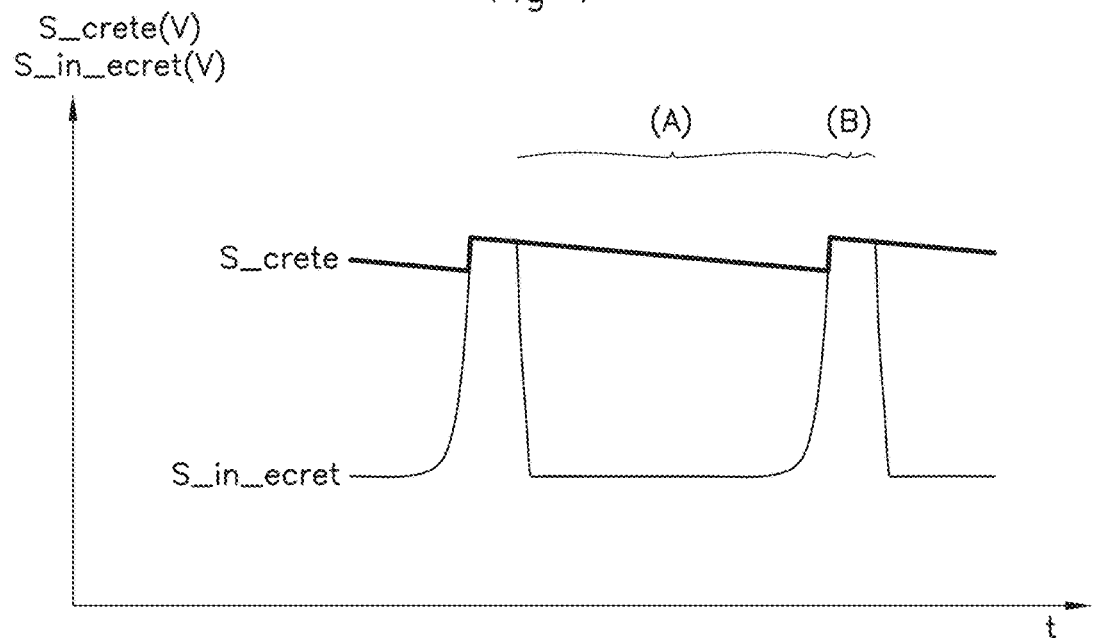
FIG. 7 illustrates a signal connecting the clipped peaks of the clipped signal of FIG. 6.

In this case a peak value S_crete, as illustrated in FIG. 7, is then defined in a step E3 as follows (similarly to the estimation of the base signal S_base).

The value of S_in_ecret is compared with the value of S_crete at a moment t, and:
- if the value of S_crete is greater than the value of S_in_ecret, the value of S_crete is fixed at the moment t+1 at the value of S_crete at the moment t multiplied by a gain coefficient "gain_1" lower than 1 (or in a variant a predetermined constant value is subtracted from the value of S_crete at the moment t in order to obtain the value of S_crete at the moment t+1),
- if the value of S_crete is lower than the value of S_in_ecret, the value of S_crete at the moment t+1 is then fixed at the value of S_in_ecret at the moment t+1.

Thus, in the example illustrated in FIG. 8, the peak signal S_crete obtained connects the clipped main peaks P4, P5 and the non-clipped main peaks P6 of the clipped signal S_in_ecret by decreasing therebetween so as to allow the detection of the main peaks of low amplitude P6 whilst avoiding the detection of secondary peaks PS. Such a detection thus defines, for each main peak, a window during which the input signal corresponds to a main peak and does not require compensation.

The use of a peak signal S_crete of negative gradient between two peaks makes it possible to detect a sudden change of amplitude of the main pressure peaks, in particular from a main peak of high amplitude P5 (high engine speed) to a main peak of low amplitude P6 (low engine speed).

In other words the usefulness of the gain is to make it possible to reach the next peak when the engine speed is decelerated, for example from 5000 revolutions per minute/ 200 bar to 4900 revolutions per minute/30 bar, without being disturbed by the valve noises. Likewise, for the estimation of the base signal S_base, it is also possible to use a sum (S_crete=S_crete−constant) rather than a gain. In addition, the gain coefficient may also be calculated on the basis of the engine speed (known thanks to the detection of peaks).

The value of the negative gradient between two peaks of the peak signal S_crete can be adapted on the basis of the frequency and the amplitude of the signal. For example, when the signal S_crete reaches a certain predetermined level close to the noise (Level_noise), corresponding for example to a pressure of 40 bar, the value of the gain coefficient may be fixed at a second value gain_2 greater than the first value gain_1 such that the peak signal S_crete decreases more slowly. Thus, for example, the first value gain_1 may be fixed such that the gradient of the peak signal S_crete is approximately −1, and the second value gain_2 may be fixed such that the gradient of the peak signal S_crete is approximately −0.5.

Thus, for example, the value gain_1 may be calculated so that, at the maximum operating speed of the engine, a consecutive peak of minimum pressure (for example 30 bar) is measured. The value gain_2 is calculated so that, at the slowest speed, the value of the peak signal is greater than the noise threshold (for example 10 bar). The deceleration is performed in the known manner by speed intervals of maximum value, for example equal to 240 to 5000 revolutions per minute. If there is still no peak when the peal signal S_crete reaches the noise level (Level_noise), it is possible to then fix the value of the gain at 1. In addition it may be envisaged to measure the noise level between two peaks so as to adjust the variable of the noise level "Level_noise" in real time.

The peak signal S_crete is thus dependent on the history of the signal. For example, if there was a peak at 200 bar, clipped to 100 bar, the peak signal S_crete will then be higher and the valve noises, which in principle are higher, will then be ignored. At low pressure and speed of the engine, the peak signal S_crete will be lower so as to arrive just above the thermal or vibratory noise threshold, which for example lies between 5 and 10 bar.

The detection of a main peak is then performed in a step E4_2 when the amplitude of the input signal S_in is greater than the amplitude of the peak signal S_crete. The critical case for peak detection appears at low frequency and low amplitude (late dropaway). In order to overcome this deficiency it is possible to count the time from when the signal S_in drops away from the signal S_base. Thus, if this time is abnormally long (for example greater than a threshold "time_s"), this means that a pressure peak is present. The addition of this parameter does not interfere with the high-frequency detection, since the device according to the invention will detect a peak before reaching the threshold time_s, but renders the detection quicker at low frequency.

Lastly, the input signal is compensated for in a step E5 solely in the absence of detection of a peak so as to provide an output signal S_out of the processing unit 20 usable by a control unit of the vehicle in order to manage the operating parameters of the engine.

FIGS. 10A and 10B illustrate the detection 100 of main peaks of an output signal of a measurement sensor with a device according to the invention and the detection 200 of peaks of the same signal with a device of the prior art based on a Kalman filter. It is then observed in FIG. 10A that the device according to the invention enables the detection of peaks of low amplitude X1, these being ignored by the Kalman filter.

In addition, it can be seen in FIG. 10B that the device according to the invention only detects one peak of high amplitude Z1, whereas the Kalman filter operates a double detection Y1, Y2, since it analyzes the apex of the peak as being a double-peak (corresponding to the noises generated at the start of combustion of the fuel in the cylinder).

The device according to the invention is thus easier to use compared with a Kalman filter whilst also correcting dysfunctions.

It should be noted, lastly, that the present invention is not limited to the examples described above and may be subject to numerous variants accessible to the person skilled in the art. In particular, the curves and the values as shown in the figures in order to illustrate an exemplary embodiment of the invention are not to be interpreted as limiting.

The invention claimed is:

1. A method for detecting pressure in a combustion chamber of a cylinder of an internal combustion engine by processing a voltage signal relating to the pressure in the combustion chamber of the cylinder of the internal combustion engine, the signal being an input signal having, in alternation, plateau phases, during which a base signal progresses on average in accordance with a linear function over time, and main peak phases, during which the input signal is representative of pressure peaks prevailing in the combustion chamber, said method comprising:
   acquiring the input signal;
   rectifying the input signal such that the gradient of the base signal is zero;
   clipping the peaks of the rectified signal of which the amplitude is greater than a predetermined voltage value to obtain an at least partially clipped signal;
   detecting a main peak when the amplitude of the input signal is greater than the amplitude of the clipped signal;
   compensating the input signal when the main peak is not detected to obtain a compensated output signal; and
   providing the compensated output signal to an electronic control unit of the vehicle to control operating parameters of the engine, the operating parameters including a moment of injection of fuel into the cylinder,
   wherein the input signal further comprises secondary noise peaks, and the predetermined voltage value is selected so as to allow the clipping of the main peaks while avoiding the clipping of the secondary noise peaks.

2. The processing method as claimed in claim 1, further comprising, after the clipping and before the detecting, generating a peak signal weighted with a gain coefficient of a first value lower than or equal to 1 when the peak signal is greater than the value of the clipped signal and made equal to the clipped signal when the peak signal is not greater than the value of the clipped signal, the detecting the main peak being performed when the amplitude of the input signal is greater than the amplitude of the peak signal.

3. The processing method as claimed in claim 2, wherein when the peak signal reaches a predetermined level, the value of the gain coefficient is fixed at a second value greater than the first value, such that the peak signal decreases more slowly.

4. The processing method as claimed in claim 3, wherein the rectifying comprises estimating the base signal and subtracting the estimated base signal from the input signal.

5. The processing method as claimed in claim 2, wherein the rectifying comprises estimating the base signal and subtracting the estimated base signal from the input signal.

6. The processing method as claimed in claim 1, wherein the rectifying comprises estimating the base signal and subtracting the estimated base signal from the input signal.

7. A processing system, comprising:
   a pressure measurement sensor configured to generate a voltage signal relating to the pressure prevailing in a combustion chamber of a cylinder of an internal combustion engine, the signal being an input signal having, in alternation, plateau phases, during which a base signal progresses on average in accordance with a linear function over time, and main peak phases, during which the input signal is representative of the pressure peaks prevailing in the combustion chamber,
   a processor configured to rectify the input signal such that the gradient of the base signal is zero, to clip peaks of the rectified signal of which the amplitude is greater than a predetermined voltage value to obtain an at least partially clipped signal, to detect a main peak when the amplitude of the input signal is greater than the amplitude of the clipped signal, to compensate the input signal when the main peak is not detected to obtain a compensated output signal, and to provide the compensated output signal to an electronic control unit of the vehicle to control operating parameters of the engine, the operating parameters including a moment of injection of fuel into the cylinder, wherein the input signal further comprises secondary noise peaks, and the predetermined voltage value is selected so as to allow the clipping of the main peaks while avoiding the clipping of the secondary noise peaks.

8. The system as claimed in claim 7, wherein the processor is configured to generate a peak signal weighted by a gain coefficient with a first value lower than or equal to 1 when the peak signal is greater than the clipped signal and made equal to the clipped signal when the peak signal is not greater than the value of the clipped signal, detecting the main peak being performed when the amplitude of the input signal is greater than the amplitude of the peak signal.

9. The system as claimed in claim 8, wherein when the peak signal reaches a predetermined level, the processor is configured to fix the value of the gain coefficient at a second value greater than the first value, such that the peak signal decreases more slowly.

10. A motor vehicle, comprising:
the device for processing a signal as claimed in claim 7.

* * * * *